United States Patent
Frank et al.

(10) Patent No.: US 11,264,885 B2
(45) Date of Patent: Mar. 1, 2022

(54) ROTOR WITH A COIL ARRANGEMENT AND A WINDING CARRIER

(71) Applicant: Siemens Aktiengesellschaft, Munich (DE)

(72) Inventors: Michael Frank, Uttenreuth (DE); Peter van Haßelt, Erlangen (DE); Johannes Richter, Fürth (DE); Christian Weidermann, Pößneck (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 107 days.

(21) Appl. No.: 16/333,485

(22) PCT Filed: Jul. 20, 2017

(86) PCT No.: PCT/EP2017/068361
§ 371 (c)(1),
(2) Date: Mar. 14, 2019

(87) PCT Pub. No.: WO2018/050330
PCT Pub. Date: Mar. 22, 2018

(65) Prior Publication Data
US 2019/0267885 A1    Aug. 29, 2019

(30) Foreign Application Priority Data
Sep. 16, 2016  (DE) .................... 10 2016 217 734.6

(51) Int. Cl.
*H02K 55/04*    (2006.01)
*H02K 9/20*     (2006.01)
(Continued)

(52) U.S. Cl.
CPC ............. *H02K 55/04* (2013.01); *H02K 9/197* (2013.01); *H02K 9/20* (2013.01); *H02K 11/028* (2013.01);
(Continued)

(58) Field of Classification Search
CPC ........ H02K 55/04; H02K 11/028; H02K 9/20; H02K 9/197; H02K 1/30; H02K 2209/00; H02K 3/47; Y02E 40/625; Y02E 40/60
See application file for complete search history.

(56) References Cited

U.S. PATENT DOCUMENTS

| | | | |
|---|---|---|---|
| 2,368,295 A | 1/1945 | Goran | 164/109 |
| 3,203,077 A | 8/1965 | Zimmerle | 29/598 |

(Continued)

FOREIGN PATENT DOCUMENTS

| | | | |
|---|---|---|---|
| CA | 993489 A | 7/1976 | H02K 55/00 |
| CN | 1787336 A | 6/2006 | H02K 19/00 |

(Continued)

OTHER PUBLICATIONS

EPO machine translation of DE 2421831 A—title "Rotorkoerper Mit Tiefgekuehlter Erregerwicklung" (Year: 1974).*

(Continued)

*Primary Examiner* — Naishadh N Desai
(74) *Attorney, Agent, or Firm* — Slayden Gruber Beard PLLC (57) ABSTRACT

Various embodiments include a rotor for an electric machine comprising: an electric coil arrangement; and a winding carrier mechanically carrying the coil arrangement and at least partially enclosing the coil arrangement on a radially outer side of the coil arrangement. The rotor includes an inner cavity for circulating a fluid coolant such that the coil arrangement comes into contact with the liquid coolant on its radially inner side as the rotor rotates.

16 Claims, 3 Drawing Sheets

(51) Int. Cl.
*H02K 11/028* (2016.01)
*H02K 9/197* (2006.01)
*H02K 1/30* (2006.01)
*H02K 3/47* (2006.01)

(52) U.S. Cl.
CPC .................. *H02K 1/30* (2013.01); *H02K 3/47* (2013.01); *H02K 2209/00* (2013.01); *Y02E 40/60* (2013.01)

(56) References Cited

U.S. PATENT DOCUMENTS

| | | | | |
|---|---|---|---|---|
| 4,275,320 | A * | 6/1981 | Baumann | H02K 55/04 310/52 |
| 4,839,214 | A * | 6/1989 | Oda | B28B 3/269 156/89.22 |
| 6,129,477 | A * | 10/2000 | Shoykhet | F16D 1/068 403/267 |
| 6,759,781 | B1 * | 7/2004 | Bushko | H02K 55/04 310/208 |
| 7,394,178 | B1 * | 7/2008 | Hsiung | H02K 1/30 310/156.12 |
| 7,928,616 | B2 | 4/2011 | Sivasubramaniam et al. | 310/52 |
| 2004/0145265 | A1 * | 7/2004 | Heiberger | H02K 31/00 310/178 |
| 2006/0119193 | A1 | 6/2006 | Laskaris et al. | 310/52 |
| 2006/0125331 | A1 | 6/2006 | Frank et al. | 310/52 |
| 2008/0122311 | A1 * | 5/2008 | Werst | H02K 1/30 310/216.004 |
| 2008/0161189 | A1 * | 7/2008 | Lewis | H02K 16/02 505/121 |
| 2015/0185771 | A1 * | 7/2015 | Clark | G06F 1/1626 320/137 |
| 2016/0365182 | A1 * | 12/2016 | Armstrong | H01F 6/06 |
| 2018/0041092 | A1 * | 2/2018 | Ourion | H02K 5/24 |

FOREIGN PATENT DOCUMENTS

| | | | |
|---|---|---|---|
| CN | 101364758 A | 2/2009 | ............. H02K 9/20 |
| CN | 101588122 A | 11/2009 | ............. H02K 3/04 |
| CN | 103199652 A | 7/2013 | ............. H02K 9/08 |
| CN | 103840574 A | 6/2014 | ............. H02K 1/12 |
| DE | 235884 C | 8/1910 | ............. H02K 3/51 |
| DE | 2421831 A * | 5/1974 | |
| DE | 29 19 115 A1 | 11/1979 | ............. F17C 13/00 |
| DE | 10 2014 114 451 A1 | 4/2016 | ............. H01F 6/04 |
| JP | 2011250601 A | 12/2011 | ............. H02K 9/19 |
| JP | 2019068622 A | 4/2019 | ............. H02K 1/27 |
| WO | 2016/118270 A1 | 7/2016 | ............. H02K 9/12 |
| WO | 2018/050330 A1 | 3/2018 | ............. H02K 55/04 |

OTHER PUBLICATIONS

Chinese Office Action, Application No. 201780057247.9, 9 pages, dated Apr. 24, 2020.

German Office Action, Application No. 10 2016 217 734.6, 9 pages, dated Aug. 28, 2017.

International Search Report and Written Opinion, Application No. PCT/EP2017/068361, 21 pages, dated Oct. 30, 2017.

* cited by examiner

ROTOR WITH A COIL ARRANGEMENT AND A WINDING CARRIER

CROSS-REFERENCE TO RELATED APPLICATIONS

This application is a U.S. National Stage Application of International Application No. PCT/EP2017/068361 filed Jul. 20, 2017, which designates the United States of America, and claims priority to DE Application No. 10 2016 217 734.6 filed Sep. 16, 2016, the contents of which are hereby incorporated by reference in their entirety.

TECHNICAL FIELD

The present disclosure relate to electric machines. Various embodiments of the teachings herein may include a rotor for an electric machine, wherein the rotor comprises at least one electric coil arrangement and at least one winding carrier which mechanically carries the at least one coil arrangement.

BACKGROUND

Coil arrangements are typically retained mechanically in the rotors of electric machines on a radially inner winding carrier. These radially inner winding carriers are often laminated iron cores which completely fill the interior and on the outside of which the windings are applied. To carry the windings mechanically, such iron cores may have a stepped profile on their radially outer side such that the radially outward projecting protrusions of the iron core engage in the center of the individual coil arrangements and can retain the latter from their center. The core of such a winding carrier here simultaneously serves to conduct the magnetic flux in the rotor.

In order to be able to cool the electric coil arrangements of the rotor, they are often coupled to a cooling system by means of a complex cooling structure. Such a cooling structure typically comprises, in particular for superconducting rotor windings, a plurality of elements with a high thermal conductivity by means of which the heat generated in the coil arrangements can be dissipated to a spatially remote circulating coolant. These thermally conductive elements may contain a high amount of copper. The circulating coolant can flow, for example, into a cavity inside the winding carrier and be recooled outside the rotor.

A cooling structure of this type and a cooling system of this type may be particularly important for the operation of the rotor when the coil arrangements have superconducting windings, the conductor material of which needs to be cooled during operation to a cryogenic temperature below the transition temperature of the superconductor. In particular in the case of a superconducting rotor of this type, the weight contribution of the cooling structure is often relatively large. However, a large weight contribution can also occur in the case of a normally conductive rotor owing to the heavy highly thermally conductive cooling structure. High loads may result from centrifugal forces occurring during operation of the rotor owing to the high densities of the iron- and copper-containing materials used. As a result, the maximum speeds of conventional machines, in particular superconducting machines, are highly limited.

SUMMARY

The teachings of the present disclosure describe a rotor which overcomes the said disadvantages. In particular, some embodiments include rotors with a relatively low mass and/or can reach high speeds. For example, some embodiments include a rotor (1) for an electric machine (21), comprising at least one electric coil arrangement (3i), at least one winding carrier (5, 5i) which mechanically carries the at least one coil arrangement (3i) and at least partially encloses the latter on a radially outer side of the coil arrangement, wherein the rotor has at least one inner cavity (7, 7i) in which a fluid coolant (9) can circulate, such that the at least one coil arrangement (3i) can come into contact with the coolant (9) at least on its radially inner side.

In some embodiments, the electric coil arrangement (3i) has a superconducting conductor material.

In some embodiments, there is a plurality n of coil arrangements (3i), wherein each of the coil arrangements (3i) is arranged in an individual winding carrier (5i) associated with it.

In some embodiments, there is a plurality n of coil arrangements (3i), wherein each of the coil arrangements (3i) is arranged on a circumferential segment, associated with it, of a superordinate common winding carrier (5).

In some embodiments, there is an additional support element (11) which is designed in the manner of a skeleton and supports the at least one winding carrier (5i) from a radially inward direction.

In some embodiments, there is a plurality of cavities (7i) which adjoin, on their radially inner side, the support element (11) and, on their radially outer side, the at least one coil arrangement (3i) and/or the at least one winding carrier (5i).

In some embodiments, there is at least one binding band (13) by means of which the at least one winding carrier (5, 5i) is fixed in the rotor.

In some embodiments, the coolant (9) is hydrogen.

In some embodiments, there is an electrically conductive damping screen (15b) and/or a cryostat wall (15a, 15b) which radially surround the at least one coil arrangement (3i).

In some embodiments, the at least one winding carrier (5, 5i) has an iron-free design.

In some embodiments, the rotor has an average material density of no more than 8 g/m3 relative to its total volume.

As another example, some embodiments include an electric machine (21) with a rotor (1) as described above and a fixedly arranged stator (23).

In some embodiments, the electric machine exhibits a power density of at least 5 KW/kg.

In some embodiments, the electric machine exhibits a nominal power of at least 5 MW.

In some embodiments, the electric machine operates at a speed of the rotor (1) of at least 1000 revolutions per minute.

BRIEF DESCRIPTION OF THE DRAWINGS

The teachings herein are further described below with the aid of some exemplary embodiments with reference to the attached drawings, in which.

DETAILED DESCRIPTION

Some embodiments include a rotor for an electric machine. the rotor may comprise at least one electric coil arrangement and at least one winding carrier which mechanically carries the at least one coil arrangement and at least partially surrounds the latter on a radially outer side of the coil arrangement. The rotor has an inner cavity in which a fluid coolant can circulate. It is designed such that the at least one coil arrangement can come into contact with the coolant at least on its radially inner side.

In some embodiments, the rotor has at least one electric coil arrangement by means of which an electromagnetic field can be formed when an electric current flows. In some embodiments, the rotor has at least two radially opposite coil arrangements which together form a pair of magnetic poles. Such a plurality of coil arrangements together forms the rotor winding. Each of the coil arrangements can here comprise either only one winding layer or a plurality of winding layers. The individual axially extending conductor regions of such a coil arrangement can be electrically connected to one another, for example via winding heads in the axial end regions. The rotor winding as a whole can here be formed either from a connected conductor or from multiple individual conductors which can be contacted with one another at least partially subsequently to form a superordinate winding.

Irrespective of the precise design of the rotor winding from one or more coil arrangements, the at least one coil arrangement may be retained mechanically by at least one radially outer winding carrier. The mechanical retention of the coil arrangement(s) is thus, in other words, achieved via an exoskeleton-like structure. In some embodiments, this exoskeleton-like structure at least partially surrounds the coil arrangement(s) radially on the outside—in other words, the winding carrier bears with more than one surface against the at least one coil arrangement in order to be able to support the latter in multiple directions. In particular, the winding carrier can adjoin the coil arrangement(s) both radially on the outside and circumferentially in order to be able to support the latter both radially outward and in an azimuthal direction against forces which are exerted. The coil arrangement can thus be supported when the rotor turns both against the outwardly acting centrifugal forces and against the circumferentially acting forces.

The fluid coolant circulates through the inner cavity such that it can remove heat from the coil arrangement from a radially inner side. For this purpose, the coil arrangement can at least partially lie free on its radially inner side—is not surrounded by the winding carrier—such that the coolant can flow over the coil arrangement on this side. In some embodiments, it can therefore come into direct contact with the coil arrangement. In some embodiments, the coolant can hereby flow onto or around the conductor winding of the coil arrangement itself. Either the conductor itself or alternatively an electric insulating, waterproofing, and/or protective layer which surrounds the conductor can be in direct contact with the coolant such that the coil arrangement can dissipate the heat occurring during operation to the coolant.

In some embodiments, the thermal coupling of the coolant to the coil arrangement(s) is achieved not only by additional thermally conductive cooling structures over a spatial distance but also by the coolant being in direct contact with a part of the coil arrangement. It is, however, not ruled out here that a thermally conductive cooling structure is additionally present. For example, a thermally conductive ring which extends circumferentially can be present in addition to the direct contact of the coolant with the coil arrangement in order to cool those azimuthal regions of the coil arrangement which are currently not in contact with the coolant when the rotor is idle. In some embodiments, at least a part of the coil arrangement is in direct contact with coolant at a specific point in time.

The described features of the rotor enable the rotor to be designed with a relatively low mass and that it can nevertheless effectively remove heat from the coil arrangement(s). The retention of the coil arrangement(s) from outside in the manner of an exoskeleton enables a cavity for the circulation of coolant to be arranged radially on the inside, next to the coil arrangement. Such an open structure allows not only the efficient removal of heat but also a low average density of the rotor because the coolant typically has a lower density than the carrying parts of the outer winding carrier.

Thus, either larger parts of the cross-section can be configured as a cavity in the axially inner region of the rotor and/or one or more further rigid elements can be provided which additionally support the at least one winding carrier. In some embodiments, the rotor can as a whole have a considerably lighter design by supporting the coil arrangement(s) from the outside than if the coil arrangement(s) is/are supported on a solid carrier situated inside. By virtue of the relatively low density or low mass of the rotor, particularly high speeds can also be obtained by the embodiments incorporating the present teachings.

In some embodiments, an electric machine incorporating the teachings herein includes a rotor as described above and a fixedly arranged stator. The advantages of such a machine are similar to the described advantages of the rotor. The described embodiments of the rotor and the electric machine can be combined with one another.

In some embodiments, the electric coil arrangement includes a superconducting conductor material. With a superconducting rotor, it is particularly important to effectively cool the conductor to a cryogenic temperature. To obtain a machine with a high power density and/or a high speed, the structures required for the cooling should not add a high weight contribution.

In some embodiments, the electric coil arrangement can comprise a high-temperature superconducting material. High-temperature superconductors (HTS) are superconducting materials with a transition temperature above 25K and, for some classes of materials, for example cuprate superconductors, above 77K. In the case of these conductors, the operating temperature can be reached by cooling using other cryogenic materials than liquid helium. However, it is not ruled out here that helium can nonetheless be used for the cooling in order to set an operating temperature which is considerably below the transition temperature. HTS materials are also particularly attractive because these materials can, depending on the choice of the operating temperature, have high upper critical magnetic fields and high critical current densities.

In some embodiments, the high-temperature superconductor can comprise, for example, magnesium diboride or an oxide ceramic superconductor, for example a compound of the type $REBa_2Cu_3O_x$ (REBCO for short), RE standing for a rare earth element or a mixture of such elements.

In some embodiments, the superconducting conductor of the coil arrangement may comprise a strip conductor, in particular a high-temperature superconducting strip conductor. The strip conductor can comprise a flat strip conductor, in particular with a rectangular cross-sectional profile. A plurality of successive turns of the strip conductor can, for example, here lie flat one on top of the other. Strip conductors in which a normally conductive substrate is coated with an HTS layer may produce superconducting coil windings for electric machines.

In some embodiments, when a superconducting rotor is present, the latter can be designed for an operating temperature of the coil arrangement(s) in a temperature range of 90K or lower, in particular in a temperature range of 77K or lower. The operating temperature can, for example, be in the range of approximately 30K.

In some embodiments, the rotor can have a plurality n of coil arrangements, wherein each of the n coil arrangements is arranged on a separate winding carrier associated with it, or be retained by said winding carrier. In other words, the structure can be segmented into individual winding carriers in order to mechanically retain the individual coil arrangements. These individual winding carrier segments can in particular be arranged on different circumferential positions of the rotor. In such an arrangement, there may be a simplified ability to produce the whole mechanical retaining structure of the coil arrangements. The individual coil arrangements can, for example, each be connected separately to the associated winding carrier before these winding carriers are connected either to one another or to a superordinate retaining structure.

In some embodiments, each of the n coil arrangements can, however, also be arranged on a circumferential segment, associated with it, of a superordinate common winding carrier or be retained by the latter. In such embodiments, an exoskeleton traverses the whole circumference of the rotor inside which the individual coil arrangements are arranged, distributed circumferentially. In some embodiments, with a superordinate winding carrier may ensure stable mechanical retention without any need for an additional element to retain the individual segments. Such a superordinate winding carrier situated radially on the outside can support the individual coil arrangements both against radial centrifugal forces and against circumferential forces without there being any need for additional retaining elements to do this.

In some embodiments, the rotor may comprise an additional support element in the manner of a skeleton, a framework, or spokes supporting the at least one winding carrier from a radially inner direction. In other words, in such an embodiment, the function of mechanically retaining the coil arrangements is spread in stages over at least two elements: the winding carrier or carriers borders or border the coil arrangement(s) radially outward and retain them from there. The additional support element supports, and retains against it, the winding carrier or carriers from a radially inner region of the rotor.

This embodiment may be useful in the case of the abovedescribed segmentation into individual winding carriers on different circumferential regions. These individual winding carrier segments are then held together by the support element and supported toward the axial center of the rotor. The support element can be designed as an internal skeleton in order to minimize as much as possible the weight contribution to the total weight of the rotor. By virtue of dividing the function into radially outer support of the coil arrangement(s) by the winding carrier or carriers, and radially inner support by the support element, different materials can be used in particular for the winding carrier and the support element. For both elements relatively light materials can be used as there is no need for the coil arrangement(s) to be coupled thermally to the coolant via these structures. The materials of the different structures can here be adapted separately to the different loads. The material of the support element can be designed specifically for its resistance to tensile loads and circumferential loads, whilst the material of the at least one winding carrier can be designed specifically for high radial compressive loads, in particular owing to possible high thermal shrinkage of the coil arrangement when being cooled down to the operating temperature. A particularly high overall strength with a low weight contribution can be obtained by a combination of an exoskeleton (winding carrier) with an endoskeleton (support element).

If the rotor has a plurality n of coil arrangements, the support element can essentially have an n-fold rotational symmetry. In such a symmetrical design, the distribution of forces may be favorable and the support element can be designed to be particularly light for predetermined speed requirements.

In some embodiments, the skeleton-like support element may comprise a non-magnetic material. In particular when using superconducting coil arrangements, the conduction of magnetic flux inside the carrying structures of the rotor is not necessary and not desirable either. A cryogenic alloy, for example a titanium, aluminum, nickel, or iron alloy which is tough at the low operating temperature of the rotor, can be used. In some embodiments, a fiber-reinforced composite can also be employed. Titanium and aluminum alloys and fiber-reinforced composites may exhibit a relatively low weight.

In some embodiments, the support element can extend essentially over the axial length of the rotor. It then supports the winding carrier or supports advantageously over this whole length toward the center of the rotor. In some embodiments, the support element can, however, also be formed only in axial part regions, in particular in the axial end regions—the so-called front faces. The interior of the rotor in the axially inner region can then either be hollow or at least have a relatively high number of cavities. This may form a rotor with the lowest possible mass. Particularly in the embodiment with a connected superordinate winding carrier, forming support elements only in axial part regions may eliminate any need for support over the whole axial length.

However, when using separate winding carrier segments to interconnect the latter on the circumference of the rotor to form a rigid structure there may be no need to form a support element over the whole axial length. In some embodiments, the individual winding carrier segments may be interconnected mainly or even essentially only via the support element. It can then be expedient if the support element extends over the majority of the axial length. In some embodiments, the support element is designed in the manner of a skeleton in order to reduce the weight contribution. If the support element is present only in axial part regions, it can alternatively also have other forms. For example, it can then also be disk-shaped. The weight contribution can then nevertheless be limited by the low axial extent of such disks.

In some embodiments, the rotor can have a plurality of cavities which adjoin the support element on their radially inner side, and adjoin the at least one coil arrangement on their radially outer side, and/or adjoin the at least one winding carrier. In some embodiments, a plurality of such cavities are distributed in the azimuthal direction over the rotor and these cavities adjoin the coil arrangement associated with the respective angular segment. The respective coil arrangement can then be cooled directly by means of coolant circulating in the respective cavity without there being any need for additional elements, which in some cases are heavy, for thermal coupling by heat transfer.

In addition to this desired contact of the respective cavity with the coil arrangement, the cavity can likewise adjoin parts of the winding carrier in order, for example, likewise to remove heat from the latter. In some embodiments, the respective cavity also adjoins other elements from which heat is to be removed, for example power supply lines which are provided for connecting the coil arrangement(s) to an external power circuit, or adjoins contacts which can be provided in order to interconnect, for example, individual winding layers of the coil arrangement(s) or to connect the individual coil arrangements of the rotor to one another. Especially for cooling such contact points or power supply lines, coolant can flow directly onto these conductor regions when they therefore adjoin the relevant cavities of the rotor.

In some embodiments, the individual cavities can be fluidically interconnected. In other words, they can therefore be configured as parts of a superordinate coolant space. For this purpose, openings can, for example, be provided in different regions of the central support element which interconnect the individual cavities and hence the individual parallel coolant ducts. For example, the support element can generally have a central pipe and a plurality of radially outward extending support struts. These support struts can have, for example, gaps or at least windows in the axial direction, through which coolant can pass into a neighboring cavity. In some embodiments, the central pipe can also be designed with windows of this type in order to fluidically connect the axially inner region of this pipe to the cavity chambers situated radially further outward. Coolant can thus pass from the central transport line inside this pipe into the regions situated radially further outward (and back again).

In some embodiments, the rotor can have at least one binding band by means of which the at least one winding carrier is fixed in the rotor. In particular, the winding carrier or the plurality of winding carriers can thus be fixed on a central skeleton-like support element. Such binding with a band may be used for fixing a plurality of segment-like winding carriers, which are distributed over the circumference of the rotor, against one another or fixing them on a support element, or both. Such a binding band can be arranged radially outside the at least one winding carrier. In this way, this winding carrier or alternatively the plurality of winding carriers can be fixed in a similar fashion to a girdle or a corset.

The binding band may comprise, for example, a strip-like element. It can be wound in the form of a spiral winding around the circumference of the rotor, or alternatively in the form of a strip surrounding the rotor circularly, or a plurality of such strips. Such a strip-like element can comprise as a material, for example, a fiber-reinforced composite, in particular a glass fiber-reinforced plastic and/or a carbon fiber-reinforced plastic. In some embodiments, the material of the binding band has a high degree of rigidity and a high tensile strength in the tangential direction of the rotor. For this purpose, the material can be one with an anisotropic strength, it also being possible however for materials with isotropic strength to be considered, depending on the embodiment. As an alternative to the design as a strip-like winding, such a binding band can also be provided by a cylinder which is shrunk onto the inner elements of the rotor, for example a metal cylinder, in particular a cylinder made from a titanium alloy. Such shrinking-on can be effected, for example, by the thermal shrinking which happens when cooling to cryogenic operating temperature takes place.

Generally and independent of the precise design of the binding band, it can be arranged with pretension around the inner elements of the rotor, i.e. in particular around the winding carrier or carriers and possibly the support element. This pretension may be chosen such that it is preserved at least partially even when the rotor is cooled down to its operating temperature. In some embodiments, such a pretensioned binding band provides the mechanical stress in the rotor which occurs during operation is converted into a tangential tensile stress in the binding band which can be absorbed by the materials of the binding band.

In some embodiments, the fluid coolant of the rotor may comprise hydrogen. Hydrogen, on the one hand, has a sufficiently low boiling point in order to act as a cryogenic coolant in the fluid state. On the other hand, it has a low density, which has a favorable effect on the overall weight of the rotor including the coolant. Such a coolant with low density is also particularly suitable for providing rotors for rapidly rotating machines with large diameters. By virtue of the low density, the change in boiling point caused by the hydrostatic pressure is also small.

In some embodiments, other liquids or gases can also be used as the coolant. Further cryogenic coolants are liquid helium, liquid neon, liquid nitrogen, liquid oxygen, and/or liquid methane. When using all these cryogenic coolants, as a principle they can be present in both liquid and gaseous form and an additional cooling action can be achieved by evaporating the liquid in the region of the components to be cooled. It is thus possible for the cryogenic coolant to circulate inside the rotor in particular in accordance with the thermosiphon effect and/or in the manner of a heat pipe.

In some embodiments, water or oil or another non-cryogenic cooling liquid to be used as the coolant. These coolants are in particular suited for cooling rotors with normally conductive coil arrangements. In some embodiments, a pump circulates the coolant in the cavity in order to achieve an effective cooling action in the region of the coil arrangement. It is in principle possible either for the relevant coolant to be configured as part of the rotor or for the rotor alternatively to be designed only for operation with such a coolant and not to comprise the coolant itself.

In some embodiments, there are means to recool the coolant using an additional cooling system. For example, a refrigeration unit can be arranged for this purpose outside the rotor, or alternatively a heat exchanger can be arranged either on the rotor itself or outside the rotor in order to transfer the heat from the coolant efficiently to the outside environment.

In some embodiments, there is an electrically conductive damping screen which surrounds the at least one coil arrangement radially. Such a damping screen may reduce the coupling of alternating electromagnetic fields into the coil arrangement(s) of the rotor and hence reduce corresponding alternating current losses in the rotor. Such a damping screen can in particular be arranged as an electrically conductive cylindrical sleeve around the coil arrangement(s) of the rotor.

In some embodiments, the rotor can have an outer cryostat wall which radially surrounds the at least one coil arrangement. Such a cryostat wall may enclose those elements of the rotor situated inside it from the hotter outside environment. In combination with super-insulation and/or an insulating vacuum, thermal separation of the inside from the outside environment here also takes place.

Such a cryostat wall can be either an individual outer cryostat wall or alternatively a combination of an inner and an outer cryostat wall can be present, wherein an insulating vacuum is advantageously provided between these two cryostat walls.

The said radially outer elements, i.e. the damping screen, inner cryostat wall, and/or outer cryostat wall, can, in the case of a plurality of coil arrangements, in particular radially surround all these coil arrangements and possibly the support element. All these radially outer elements can, when present in the relevant embodiment, may have a cylindrical design, in particular a circular cylindrical design.

The damping screen can be provided by the winding carrier itself or by the plurality of winding carriers. In some embodiments, individual winding carrier segments can also be interconnected in an electrically conductive fashion such that they can act together as a damping screen.

In some embodiments, the damping screen can also be provided by one of the cryostat walls or by both cryostat walls. It is thus also possible for a plurality of the said elements to together fulfill the function of the damping screen. In some embodiments, the damping screen may comprise metal materials (for example, aluminum alloys) or materials containing carbon nanotubes.

The at least one cryostat wall can also be provided in particular by the winding carrier itself or by the plurality of winding carriers. In some embodiments, the cryostat wall can be identical to the damping screen without this element being formed by the winding carrier or carriers. Generally and irrespective of which elements are combined with one another in the respective embodiment, the at least one cryostat wall can be formed from a metal material. Alloys containing aluminum and iron may be used but any other vacuum-tight material can also be considered.

In some embodiments, there is a nested arrangement of an inner and outer cryostat wall and at least the inner cryostat wall is both leaktight and resistant with respect to the coolant used. In particular, the inner cryostat wall may be formed from a material which is robust with respect to the action of hydrogen. In the case of such an embodiment, the inner and outer cryostat wall can be formed from different materials because the requirements are different here. Thus, the inner cryostat wall can then comprise a hydrogen-resistant titanium alloy, aluminum alloy, or iron alloy, in particular a so-called super-austenitic alloy.

In some embodiments, the at least one winding carrier can have an iron-free design. In particular, all the winding carriers present in the rotor can have an iron-free design. They can even be designed so that they are completely free of materials that conduct magnetic flux. When present in the rotor, the central support element can also be free of such materials that conduct magnetic flux. Such a design with no magnetically soft materials inside the rotor may be used in connection with superconducting coil arrangements because here the conduction of magnetic flux through the other rotor elements is not necessary or not effective owing to the high magnetic flux densities and the saturation resulting therefrom. The iron-free design allows lighter materials to be used and hence a lower density of the rotor can be obtained.

In some embodiments, the rotor has an average material density of no more than 8 $g/m^3$ relative to its total volume. The average material density may be no more than 5 $g/cm^3$ or even no more than 3 $g/m^3$. The total volume should here be understood to be the total volume enclosed by the rotor, for example the total cylindrical volume including the cavities situated inside. By virtue of the described open structure of the rotor in which the coil arrangement(s) are retained by one or more winding carriers in the form of an exoskeleton, a higher number of inner cavities can be created.

Even when these cavities are filled partly or even fully with fluid coolant, a contribution to the average density is nevertheless created which is considerably lower than with conventional materials for the winding carrier such as steel. When relatively light materials such as aluminum or titanium alloys or carbon fiber composites are used additionally for the at least one outer winding carrier and the optionally present support element, a very low average density can be achieved as a whole in the regions described. The density of the materials used for the winding carriers and/or support element can here generally be less than 5 $g/cm^3$. When the average density relative to the total volume is in the abovedescribed ranges, a machine with a particularly high power density can be provided with the rotor, which can have a very favorable effect in particular when used in vehicles, in particular in aircraft.

In some embodiments, the material of the at least one winding carrier may have a thermal coefficient of expansion which is greater than the effective thermal coefficient of expansion of the electrical conductor. Such an embodiment may be useful with superconducting coil arrangements because then the winding carrier or carriers shrinks or shrink to a greater degree than the coil arrangement embedded therein when it cools down from room temperature to a cryogenic operating temperature. Thus the winding carrier therefore shrinks onto the coil arrangement when it cools and compresses the latter. A pretensioned state results therefrom in which mainly compressive stress is exerted on the superconducting conductor. These conductors are generally less sensitive to compressive stress than to tensile stress because tensile stress can more easily cause the superconducting material to delaminate from a support situated underneath. This applies in particular to the superconducting layer in a superconducting strip conductor.

In some embodiments, the rotor may form a p-pole magnetic field, wherein the number of poles p can be between 2 and 12, between 6 and 12, and in particular cases precisely 8. For this purpose, the number of poles p can be identical to the number n of coil arrangements which are present in the rotor and distributed circumferentially.

In some embodiments, the rotor may include a rotor shaft for mounting the rotor so that it can rotate about an axis of rotation. This shaft can in particular be a segmented shaft which can have, for example, at least one solid segment and at least one hollow segment. In some embodiments, the rotor shaft may be hollow at least in an axially inner region of the rotor in order to conduct fluid coolant into the inside of the rotor and/or conduct it away from there.

In some embodiments, an electrical machine with one of the rotors described above can be designed for a power density of at least 5 KW/kg, or even be designed for a power density of at least 10 kW/kg. In the case of a machine with such a high power density, the described advantages of the rotor are particularly valid. Machines with such high power densities are, on the other hand, a fundamental prerequisite for fully electrically powered aircraft. However, they are also advantageous in the field of other, in particular other mobile, applications. The said power density should be understood as the nominal power of the machine relative to its total weight, relative to the weight of the stator, rotor, housing, cooling system, and any other components which may be present in addition.

In some embodiments, the machine may have a nominal power of at least 5 MW, or even at least 10 MW. With such a high power, it is in principle suitable for powering a vehicle, in particular an aircraft. In some embodiments, however, using such a high-power machine it is also possible for the electrical current required for the powering to be generated onboard the vehicle during operation as a generator. The machine can in principle be configured either as a motor or a generator, or optionally designed for both types of operation. To obtain the described high power and/or power densities, superconducting coil arrangements may allow particularly high power densities.

In some embodiments, the machine may operate at a speed of the rotor of at least 1000 revolutions per minute, in particular even for at least 3000 revolutions per minute. Such high speeds can be achieved particularly well owing to the described design of the rotor with a relatively low density. With conventional rotors, they can in some cases not be achieved at all at the magnitude required for the said power ranges. The power densities which are advantageous for the described applications can, on the other hand, in some circumstances not be achieved at all with machines that rotate slowly.

Figure 1:
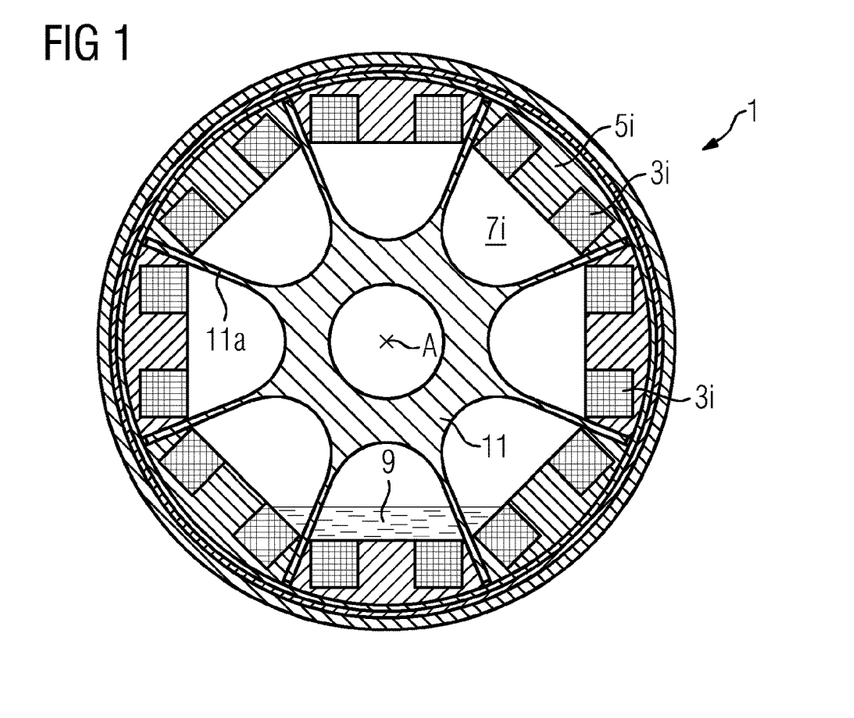
FIG. 1 shows a schematic view in cross-section of a rotor incorporating teachings of the present disclosure.

FIG. 1 shows an example rotor incorporating teachings of the present disclosure in a schematic cross-section perpendicular to the axis of rotation A. In this example, the rotor has eight coil arrangements $3i$ connected to form a superordinate rotor winding. This rotor winding generates an eight-pole magnetic field. In this example, the individual coil arrangements $3i$ are each retained mechanically separately by a winding carrier $5i$ associated with them. These eight winding carriers $5i$ support the coil arrangement $3i$ associated in each case with them from a radially outer side. For this purpose, they adjoin the radially outer sides of these coil arrangements $3i$. Moreover, they also adjoin the coil arrangements $3i$ with their lateral surface, i.e. in an azimuthal direction, such that these coil arrangements are surrounded and retained on multiple sides by the respective winding carrier. Only at their respective radially inner side do the individual coil arrangements $3i$ not adjoin the winding carrier $5i$ but instead an associated inner cavity $7i$. A fluid coolant, in the present example liquid hydrogen, can flow through this cavity in order to cool the coil arrangement $3i$ adjoining the respective cavity $7i$.

The eight winding carriers $5i$ therefore support the eight coil arrangements $3i$ from the outside, in the manner of an exoskeleton. In the example shown in FIG. 1, the eight winding carriers take the form of separate elements. They are each supported radially inward by a common support element 11 which is likewise constructed in the manner of a skeleton but in this case in the manner of an endoskeleton. The support element has an eight-fold symmetry in order to support the forces which act on the eight coil arrangements as uniformly as possible.

Figure 2:
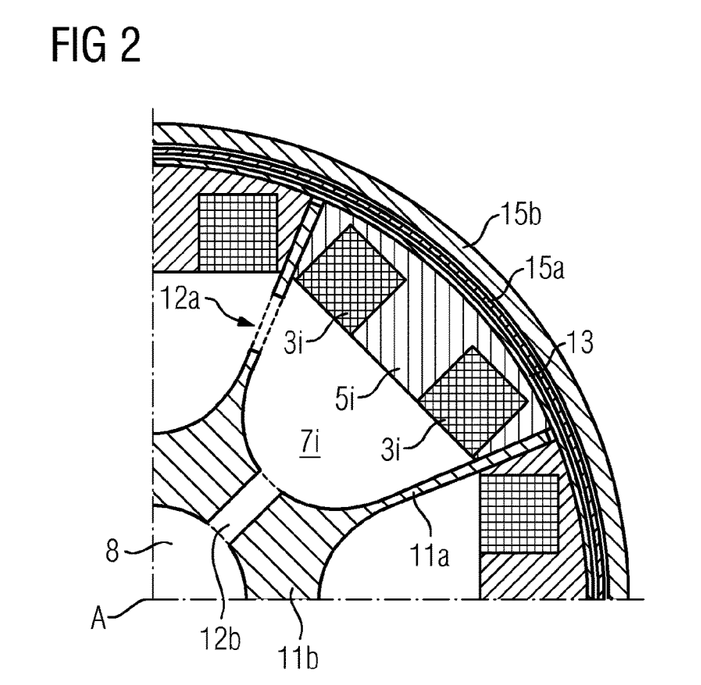
FIG. 2 shows a schematic part view of the cross-section from FIG. 1.

The structure of the rotor cross-section in FIG. 1 is shown in more detail in FIG. 2 for a quadrant. It can be seen in FIGS. 1 and 2 that the support element has an inner hollow pipe 11$b$ and eight support struts 11$a$ extending radially outward from there. The eight winding carriers 51 are here each supported on two support struts 11$a$ which are adjacent to each other. Inner cavities $7i$, in which coolant can flow onto the respectively associated coil arrangement $3i$, are provided in each case by the regions between the support struts 11$a$. These individual inner cavities $7i$ are fluidically interconnected to form a superordinate coolant space. They are likewise connected to the pipe interior 8 of the central hollow pipe 11$b$. For this purpose, the support struts 11$a$ each have openings 12$a$, and the inner hollow pipe 11$b$ has a plurality of openings 12$b$. These openings 12$a$ and 12$b$ are indicated in FIG. 2 by dashed lines. They do not extend over the whole axial length of the rotor 1 but can be distributed at regular or irregular intervals over its length. The only essential thing is that cooling fluid can be exchanged between the individual part spaces $7i$ and 8, and that at the same time the support element 11 ensures a sufficient support for the radially outer elements $5i$ and $3i$.

In the axial portion of the rotor 1 shown in FIGS. 1 and 2, the latter therefore has a hollow shaft which is provided by the inner hollow pipe 11$b$. Cold and/or liquid coolant can pass through the pipe interior 8 into the cavities $7i$ situated radially further outward and cool the coil arrangements there. When using liquid hydrogen and other liquid cryogenic coolants, partial evaporation of this cooling liquid can take place. Then both liquid and gaseous cooling fluid can coexist in the cavities of the rotor 1. When the volume of liquid is so low that it fills only part of the volume of the cavity, not all components are cooled uniformly when the rotor 1 is idle. Such an idle state is indicated in FIG. 1 by the horizontal liquid level of the cooling fluid 9. However, when the rotor 1 turns, the liquid coolant 9 is distributed by the centrifugal forces essentially uniformly over the individual cavities and the individual coil arrangements $3i$. For this purpose, the individual components are cooled uniformly during operation of the electric machine which is equipped with such a rotor.

A cooling action can, however, in principle also be achieved when this machine is not operating. When the volume of liquid and/or the cooling action of the gaseous coolant is not sufficient for cooling to a predetermined temperature, the rotor can thus be rotated slowly, for example, in a cool-down phase. This rotation must not be so high that the coolant is distributed uniformly over the circumference of the rotor 1. For example, for cooling down to a predetermined operating temperature, it may be sufficient if the rotor 1 turns slowly such that the individual coil arrangements $5i$ come alternately into contact with the coolant 9 and hence are cooled as a whole in the course of time.

In the example shown in FIGS. 1 and 2, the individual winding carriers $5i$ are held together by being pressed with pretension against the support element 11 by means of a binding band 12, situated radially further outward. In other words, the individual elements of the exoskeleton $5i$ are here strapped to the individual struts 11$a$ of the endoskeleton 11. Arranged radially outside this binding band 13 is an inner cryostat wall 15$a$ which is in turn surrounded by an outer cryostat wall 15$b$. In the example shown, at least the outer cryostat wall 15$b$ acts simultaneously as an electromagnetic damping screen. An annular vacuum space is formed between the inner cryostat wall 15$a$ in the form of a cylindrical sleeve and the outer cryostat wall 15$b$, likewise in the form of a cylindrical sleeve. As a result, that region of the rotor 1 which is situated inside the cryostat walls 15$a$ and 15$b$ is thermally insulated from the outer environment. Both cryostat walls 15$a$ and 15$b$ are designed to be vacuum-tight. The inner cryostat wall 15$a$ is here manufactured from a material which is simultaneously leakproof with respect to the hydrogen coolant and robust.

The rotor 1 shown in FIGS. 1 and 2 has an overall very light design because it has a relatively large volume of inner cavities $7i$ and 8 and because the support element 11 and the winding carriers $5i$ can be formed from materials with a low density. Additional heavy copper elements for indirectly cooling the coil arrangements $3i$ can be dispensed with here because the coil arrangements $3i$ are in direct contact with the coolant 9 via the open structure.

Figure 3:
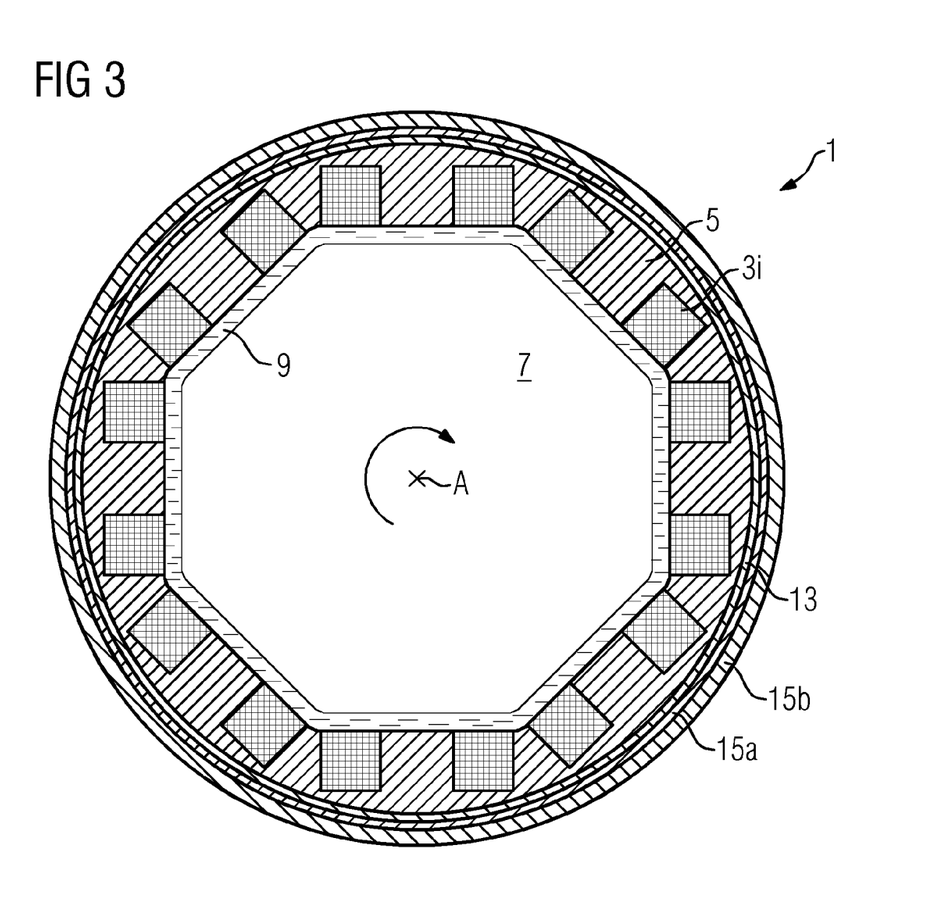
FIG. 3 shows a schematic view in cross-section of a rotor incorporating teachings of the present disclosure.

FIG. 3 shows an alternative embodiment of a rotor 1 incorporating teachings of the present disclosure, likewise in a schematic cross-section perpendicular to the axis of rotation A. Here too eight coil arrangements $3i$ are present, by means of which in total an eight-pole magnetic field can be generated. In contrast to the example above, a common annular or sleeve-like winding carrier 5 is present here which carries the individual coil arrangements $3i$ from a radially outer side. An additional support element inside the rotor 1 is not required here owing to the self-supporting structure of this winding carrier ring. The elements situated radially further outward, i.e. the binding band 13, the inner cryostat wall 15*a*, and the outer cryostat wall 15*b* here have a similar design as the example above. The binding band 13 is optional here because the annular winding carrier 5 supports itself and the coil 3 and does not need to be pressed onto a support structure. It can, however, nevertheless be advantageous, by virtue of such a binding band 13, to apply externally applied pretension to the winding carrier 5 in order to increase its mechanical stability and/or to support it with tension against support elements which are situated axially further outward and are therefore not shown here.

Also in the example in FIG. 3, a fluid coolant 9 can flow inside the inner cavity 7, wherein here too the liquid form can be present together with the gaseous form in a space 7. When the electric machine which is equipped with such a rotor 1 is operating, the rotor 1 rotates about the axis A, as indicated by the arrow in the center. The liquid coolant is hereby distributed over the circumference of the rotor when there is a sufficiently high speed, as shown schematically by the annular liquid level.

Figure 4:
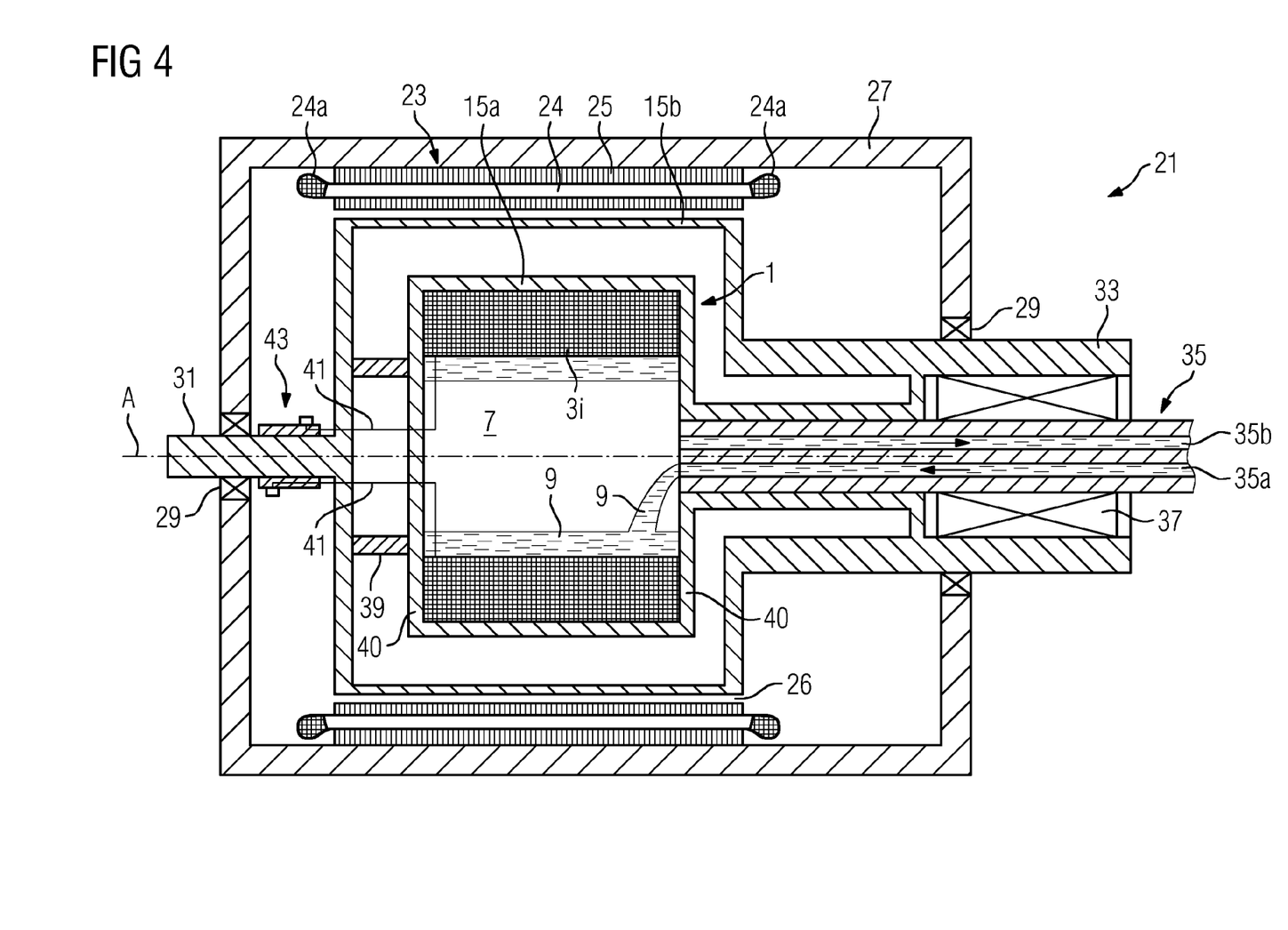
FIG. 4 shows a schematic longitudinal section of a machine incorporating teachings of the present disclosure.

FIG. 4 shows an exemplary embodiment for an electric machine 21 which is equipped with a rotor 1 incorporating the teachings herein. A schematic longitudinal section along the axis of rotation A is shown here. The machine moreover has a fixedly arranged stator 23 which surrounds the rotor 1 radially and which is connected to the machine housing 27. The rotor 1 is mounted on a rotor shaft 31 so that it can rotate about the axis of rotation A, wherein this rotor shaft 31 is designed as a hollow shaft 33 in the central part of the rotor 1 and in the region shown on the right. The rotor shaft 31 is therefore a segmented shaft. In the left-hand part of FIG. 4, the shaft can either be configured as a solid shaft or also configured here as a hollow shaft with a smaller cavity, for example in order to be able arrange power supply lines inside the shaft.

The rotor shaft 31, 33 is supported so that it can rotate via bearings 29 in the axial end regions of the machine against the fixed machine housing 27. The torque is transmitted between the rotor shaft 31 and the actual rotor 1 in the part of the rotor 1 shown on the left. For this purpose, a torque-transmission device 39, which has a circular cylindrical design in the example shown, is arranged between the rotor 1 and the rotor shaft 31. Moreover, power supply lines 41 are arranged on this side of the rotor in order to connect the coil arrangements 3*i* of the rotor 1 to an outer power circuit via slip rings 43. From the side of the rotor 1 shown on the right, fluid coolant 9 is fed via the hollow shaft 33 into the inside of the rotor and guided from here back to the outside. For this purpose, the hollow shaft 33 has a supply line 35*a* and a return line 35*b* inside it. At the shaft end shown on the right, these lines can be connected to a cooling system situated outside the shaft to form a closed coolant circuit (not shown in detail here). These lines 35*a* and 35*b* are fixedly arranged inside the hollow shaft 33 as part of a superordinate coolant pipe 35 and connected to said shaft by a rotary transmission 37.

The rotor 1 of the electric machine shown in FIG. 4 can be configured, for example, in a similar fashion to that in FIG. 3. It can in particular have a plurality of coil arrangements 3*i* which are designed to form a p-pole magnetic field. These coil arrangements 3*i* are in turn distributed over the circumference of the rotor 1 and are retained mechanically by one or more outer winding carriers 5 or 5*i*. These winding carriers are here not shown in detail for the sake of clarity. In the example in FIG. 4, the inside of the rotor has a continuous inner cavity 7 with no inner support structure, similar to the rotor in FIG. 3. The winding carriers and hence the coil arrangements 3*i* are retained solely at the two axial end regions of the rotor by disk-shaped support elements 40. As an alternative to the embodiment shown in FIG. 4, however, it is also possible for the rotor to have a skeleton-like support element in the axially inner region of the rotor 1, by means of which one or more winding carriers 5, 5*i* are supported from inside.

The coil arrangements 3*i* and hence also the winding carriers not shown here are surrounded radially by an inner cryostat wall 15*a* and then by an outer cryostat wall 15*b*. A vacuum space V, which is shown considerably enlarged in comparison with the example in FIGS. 1 to 3, is provided between them for thermal insulation. These size ratios are, however, not to scale and the drawings should in this respect be understood to be only schematic. The fixed parts of the stator 23 are arranged outside the outer cryostat wall 15*b*. In particular, a stator winding 24, the axial winding portions of which are connected to winding heads 24*a* in their axial end regions, is arranged on the stator winding carrier 25. When the electric machine 21 is operating, the stator winding 24 interacts electromagnetically with the electromagnetic field of the rotor 1. This interaction takes place via an air gap 26 which is situated radially between the rotor 1 and the stator 33. In the example shown, the stator winding 24 is supported by a non-magnetically designed stator winding carrier 25, and here there is therefore an air-gap winding with no iron teeth between the turns of the winding.

What is claimed is:

1. A rotor for an electric machine, the rotor comprising:
   two electric coil arrangements;
   a respective winding carrier radially exterior to each of the two coil arrangements and at least partially enclosing the respective coil arrangement on a radially outer side of the respective coil arrangement; and
   a common support extending between the two coil arrangements to support both of the respective winding carriers from a radially inward direction;
   wherein the rotor includes an inner cavity for circulating a fluid coolant such that the liquid coolant comes into direct contact with a radially inner side of each of the two coil arrangements as the rotor rotates.

2. The rotor as claimed in claim 1, wherein the two electric coil arrangements each comprise a superconducting conductor material.

3. The rotor as claimed in claim 1, further comprising more than two coil arrangements;
   wherein each of the more than two coil arrangements is arranged in a respective winding carrier with exactly one other coil arrangement.

4. The rotor as claimed in claim 1, further comprising an additional support element skeleton supporting the winding carrier from a radially inward direction.

5. The rotor as claimed in claim 4, further comprising a plurality of cavities adjoining, on their radially inner side, the support element and, on their radially outer side, the coil arrangement and/or the winding carrier.

6. The rotor as claimed in claim 1, further comprising a binding band fixing the winding carrier in the rotor.

7. The rotor as claimed in claim 1, wherein the liquid coolant comprises hydrogen.

8. The rotor as claimed in claim 1, further comprising an electrically conductive damping screen radially surrounding the coil arrangement.

9. The rotor as claimed in claim 1, wherein the winding carrier is iron-free.

10. The rotor as claimed in claim 1, wherein the rotor has an average density of no more than 8 g/m3 over a total volume of the rotor.

11. An electric machine comprising:
a fixed stator; and
a rotor comprising:
two electric coil arrangements;
a respective winding carrier radially exterior to each of the two coil arrangements and at least partially enclosing the respective coil arrangement on a radially outer side of the respective coil arrangement; and
a common support extending between the two coil arrangements to support both of the respective winding carriers from a radially inward direction;
wherein the rotor includes an inner cavity for circulating a fluid coolant such that the liquid coolant comes into direct contact with a radially inner side of each of the two coil arrangements as the rotor rotates.

12. The electric machine as claimed in claim 11, wherein the electric machine generates a power density of at least 5 KW/kg.

13. The electric machine as claimed in claim 11, wherein the electric machine generates a nominal power of at least 5 MW.

14. The electric machine as claimed in claim 11, wherein the rotor spins at a speed of at least 1000 revolutions per minute.

15. The rotor as claimed in claim 1, further comprising a cryostat wall radially surrounding the coil arrangement.

16. A rotor for an electric machine, the rotor comprising:
an electric coil arrangement;
a winding carrier radially exterior to the coil arrangement and at least partially enclosing the coil arrangement on a radially outer side of the coil arrangement;
a first support element skeleton extending along a first side of the coil arrangement to support the winding carrier from a radially inward direction;
a second support element skeleton extending along an opposite side of the coil arrangement supporting the winding carrier from a radially inward direction; and
an inner cavity adjoining, on a radially inner side, the first support element skeleton and the second support element skeleton and, on a radially outer side, the coil arrangement and/or the winding carrier;
wherein the inner cavity provides a volume for circulating a fluid coolant such that the liquid coolant comes into direct contact with a radially inner side of the coil arrangement as the rotor rotates.

* * * * *